United States Patent

[11] 3,592,451

| [72] | Inventor | Richard Lee McDuffee<br>R.R. #1, Box 732 L, Aurora, Ill. 60504 |
|---|---|---|
| [21] | Appl. No. | 806,548 |
| [22] | Filed | Mar. 12, 1969 |
| [45] | Patented | July 13, 1971 |

[54] ABSORBENT PAD STRUCTURES FOR HUMIDIFIERS
12 Claims, 9 Drawing Figs.

[52] U.S. Cl. .................................................. 261/103, 55/491, 55/521
[51] Int. Cl. ............................................... B01f 3/04
[50] Field of Search .......................................... 261/DIG. 41, DIG. 44, 94, 96, 97, 99, 103, 104, 106, 107; 55/278, 521, 511, 491

[56] References Cited
UNITED STATES PATENTS

| 1,640,291 | 8/1927 | Perkins | 261/106 X |
|---|---|---|---|
| 1,927,593 | 9/1933 | Mohler | 261/103 |
| 1,973,233 | 9/1934 | Thousand | 261/103 |
| 2,079,297 | 5/1937 | Manning | 55/491 X |
| 2,271,342 | 1/1942 | Korts | 261/DIG. 44 |
| 2,404,497 | 7/1946 | Essick | 261/DIG. 41 |
| 2,856,166 | 10/1958 | Goettl | 261/97 X |
| 2,971,750 | 2/1961 | Boling | 261/111 |
| 2,981,367 | 4/1961 | Sprouse | 55/491 |
| 3,045,450 | 7/1962 | Chandler | 261/99 |
| 3,075,750 | 1/1963 | Goettl | 261/DIG. 41 |
| 3,076,303 | 2/1963 | Durgeloh | 55/511 |
| 3,171,401 | 3/1965 | McDuffee | 261/DIG. 15 |
| 3,176,446 | 4/1965 | Siggelin | 261/94 X |
| 3,193,259 | 7/1965 | Liebmann | 261/DIG. 44 |
| 3,199,846 | 8/1965 | Durham et al. | 261/106 X |
| 3,278,175 | 10/1966 | Hirtz | 261/103 X |
| 3,284,068 | 11/1966 | Goettl | 261/97 |
| 3,395,900 | 8/1968 | Meek | 261/97 X |
| 3,440,807 | 4/1969 | Gaines, Jr. | 55/511 |
| 3,479,018 | 11/1969 | Jaye | 261/103 |

*Primary Examiner*—Tim R. Miles
*Attorney*—Mc Dougall, Hersh, Scott & Ladd

ABSTRACT: Absorbent pad structures for humidifiers wherein the pads are formed of a block of corrugated absorbent material with passages in the corrugated block providing openings for an airstream. A water trough is located at the top of the pad, and water is passed through openings in the trough for absorption by the corrugated material. In one form, the material forming the corrugations extends vertically and a wick is provided across the top of the pad to distribute the water. Means are alternatively provided for supporting the corrugated block between frame members and for leveling the structure. The passages in the pad may be positioned so that "uphill" movement of water is required to minimize the collection of free water by the airstream.

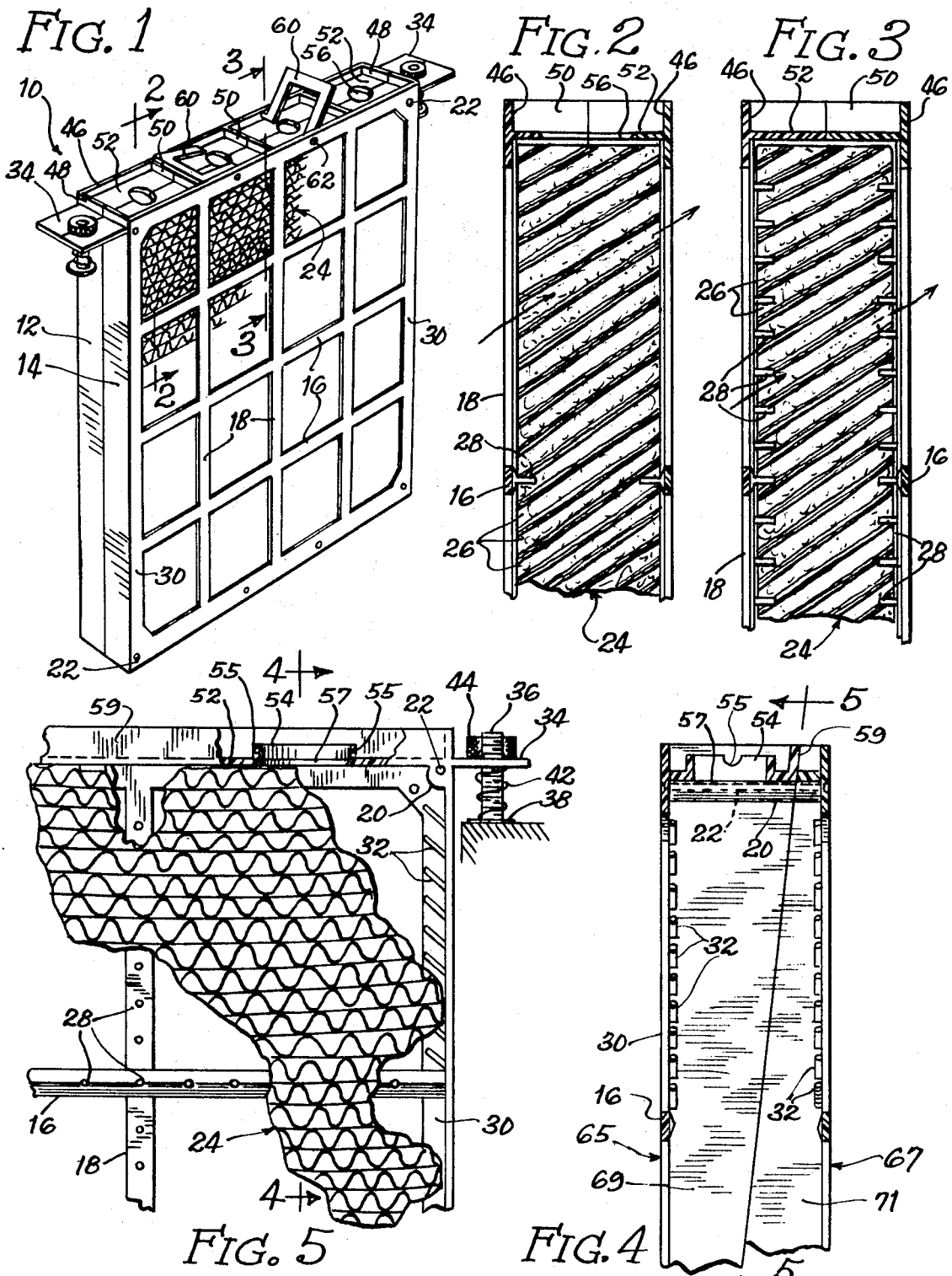

ABSORBENT PAD STRUCTURES FOR HUMIDIFIERS

This invention relates to humidifiers, and particularly to absorbent pads for use in such constructions.

In the operation of humidifier constructions, an airstream is brought into contact with moisture whereby the air stream emerging from the apparatus will contain more moisture than the stream entering the apparatus. In some instances, pads of material are located in the path of the air stream. The pads are characterized by the ability to retain water, and they are usually designed to provide a large surface area to provide maximum opportunity for the pickup of water. Mesh materials and corrugated materials have been suggested for such pads.

A significant problem in humidifier constructions relates to efficient pickup of moisture by airstreams. Some pad constructions comprise wire mesh which is treated so that moisture will cling to its surfaces. The wire provides a suitable amount of moisture; however, the moisture is often present in beads of water and, therefore, large water particles tend to be present in the air issuing from the apparatus. This water may drop out of the stream so that it will serve no significant purpose, and it also tends to damage structures which it contacts, for example by causing corrosion, or by leaving a deposit when the water vaporizes.

Corrugated materials have been utilized, for example corrugated asbestos. These materials absorb water and, therefore, the airstreams will tend to pickup very small particles as opposed to water droplets. Constructions utilizing corrugated material have disadvantages, however, since it is difficult to support the material when it becomes soaked with water, and this lack of support causes clogging and nonuniform operation. Furthermore, it is difficult to control the water additions to the absorbent pads and water droplets occur in localized areas, again causing the droplets to be entrained in the airstream issuing from the apparatus.

Applicant's copending application Ser. No. 728,537, filed May 13, 1968, now U.S. Pat. No. 3,497,185 describes a structure which overcomes these disadvantages.

It is the primary object of this invention to provide improved pad designs which are characterized by further improvements in efficiency of operation.

It is a more specific object of this invention to provide an improved design for absorbent pads and associated structures whereby assembly, installation, moisture addition and moisture pickup are simplified and made more effective.

These and other objects of this invention will appear hereinafter and for purposes of illustration but not of limitation, the specific embodiments of the invention are shown in the accompanying drawings in which:

FIG. 1 comprises perspective view of an assembly including an absorbent pad and supporting structure;

FIG. 2 is an enlarged fragmentary, sectional view taken about the line 2-2 of FIG. 1;

FIG. 3 is an enlarged fragmentary sectional view taken about the line 3-3 of FIG. 1;

FIG. 4 is an enlarged fragmentary sectional view illustrating an alternative form of the invention;

FIG. 5 is an enlarged fragmentary sectional view taken about the line 5-5 of FIG. 4;

Figure 6:
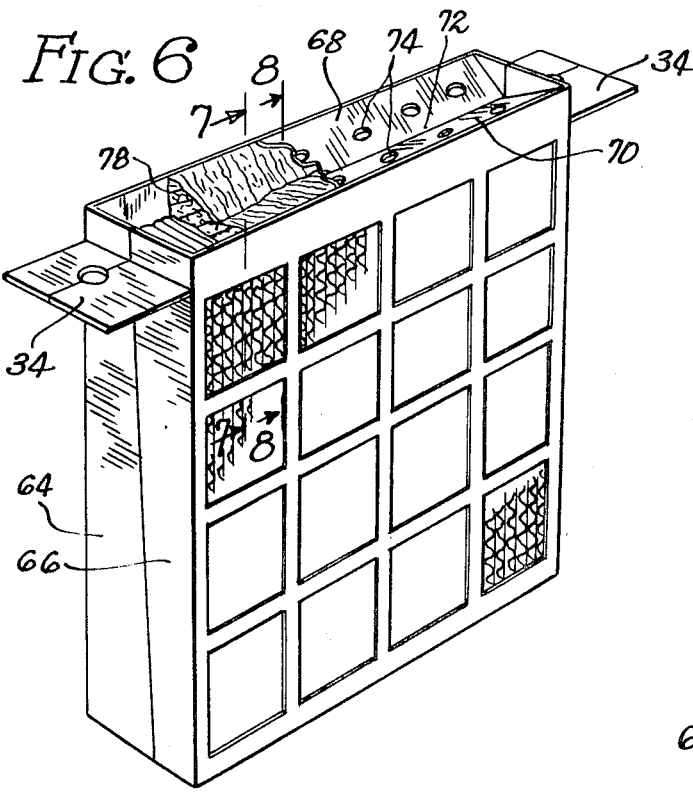
FIG. 6 is a perspective view of an alternative form of the invention.

The instant invention generally relates to a humidifier apparatus having moisture-holding elements disposed therein. Relatively dry air is moved into contact with the surfaces of these elements for pickup of moisture by the air whereby relatively moist air is discharged by the apparatus. The invention specifically relates to absorbent pads which provide the moisture-holding surfaces which contact the airstream. The absorbent pads comprise a block of material, for example corrugated material, with passages in the material aligned in the direction of airflow. Due to the absorbing characteristics of the block of material, the water spreads throughout the block for most efficient contact with an airstream.

FIG. 1 illustrates a construction 10 comprising one embodiment of the instant invention. This construction includes mating rectangular frames 12 and 14. A plurality of transverse members 16 and vertically extending members 18 extend across the face of each frame to provide a relatively rigid structure. The frames may be formed of molded plastic and can be mass produced in a highly efficient manner.

The frames may be secured together in the manner illustrated relative to the form of the invention shown in FIGS. 4 and 5. Enlarged portions 20 are defined at each corner of the frames, and small diameter openings extend through these portions. Pins 22, preferably spring pins, are forced into these openings to resiliently hold the frame sections in position.

Prior to securing the frames together, a block 24 of corrugated material is located between the frames. These corrugated blocks may be produced in the manner described in applicant's copending application, Ser. No. 728,537. As indicated therein, the blocks define a plurality of passages 26 whereby airstreams are adapted to enter from one side and pass out of the opposite side of the blocks. The blocks are designed to hold moisture so that the airstreams will pick up moisture to provide the desired increase in humidity.

Each of the crossmembers 16 and 18 is provided with a plurality of inwardly extending pegs 28. When a block 24 is located over the face of one of the frame sections, the pegs will penetrate the block to provide support. It has been found that this support is extremely important during operation of a humidifier apparatus utilizing structures of this invention. Thus, the corrugated material is highly desirable from the standpoint of holding moisture for most efficient pickup by an airstream. The material, however, tends to sag when saturated with moisture, and there is, therefore, a tendency for the passages to be reduced in size thereby impairing the airflow. The provision of the supporting pegs will substantially eliminate this problem.

Each of the frames defines a border 30 along its opposite sides, and a plurality of ribs 32 are formed thereon. These ribs are slanted so that the innermost portions are at a higher level than the outermost portions whereby the side edges of the blocks 24 are supported by the ribs. It has been found that the sagging tendency is particularly severe along the side edges, and the provision of these ribs will substantially eliminate this condition. The upward slant of the ribs is particularly desirable in this connection.

Each of the frame sections also defines outwardly extending wing portions 34. The wing portion may be formed with semicircular recesses whereby a circular opening is defined between the wings when the frame sections are in position; or as in the embodiment of FIGS. 4 and 5, the circular opening may be formed entirely in the wing portion of one frame. In either case, a leveling means for the construction is received in this opening. This leveling means comprises a threaded member 36 having a foot 38 for resting on the surface 40 comprising a wall of the humidifier apparatus which defines the area for receiving the humidifier pad.

A spring 42 extends between the foot 38 and the wings 34 to normally hold the wings in spaced relation relative to the wall 40. A nut 44 can be adjusted to vary this spacing whereby the construction can be made level even though the wall 40 may be at a different elevation than the wall on the opposite side. These leveling means solve a problem often encountered upon installation of humidifier pads. Thus, any tilting of the pad will result in concentration of water on the one side or the other of the pad whereby nonuniform ad inefficient operation will result.

The design shown in FIGS. 1, 2 and 3 includes a trough defined by upwardly extending sidewall portions 46 formed on the long dimension of the frame sections, and sidewall portions 48 formed on the short dimension of the frame sections. These sidewalls combined with intermediate wall portions 50 provide individual basins 52 for receiving water. The basins 52 each define an opening 56 for passage of water into the contact with the pad 24.

Extending between the wall portions 46 are a pair of handles 60. These handles each define outwardly extending pegs which are received at 62 in the wall portions 46. The handles are formed of plastic material whereby their legs can be pressed inwardly for movement between the wall portions 46, and whereby the pegs on the handle legs will snap into the openings 62. Although the handles are shown in association with the top wall, suitable wings or other means for receiving the pegs may be located on the sides or bottom.

One particularly important aspect of this invention involves the design of the corrugated block 24, particularly shown in FIGS. 2 and 3. It will be noted that the passages 26 of this block extend upwardly from the point of entry of the airflow to the point of exit. With this arrangement, the air moves uphill, and it has been found that this will substantially eliminate any tendency toward pickup of water particles by the air. Thus, any beads of water present in the passages which might otherwise be moved by the airstream will be deterred from such movement since the water will have to move in opposition to the force of gravity. The pitch of the passages can be varied depending upon the velocity of airflow for a particular installation whereby a highly suitable means is provided for designing humidifier pads best suited for particular applications.

FIGS. 4 and 5 illustrate the use of intermediate barrier walls 54 located in the troughs 52. These barrier walls define notches 55 which permit the passage of water into openings 57. These openings extend through the bottom wall of the troughs 52 to permit passage of water into contact with the corrugated pad.

The construction of FIGS. 4 and 5 is also unique in that the frame members 65 and 67 define sidewalls 69 and 71 which have angularly extending mating edges. Thus, the sidewall 69 is relatively wide at its upper end while the sidewall 71 is narrow; however, when the respective frames are mated, a rectangular configuration is achieved.

By designing the sidewalls in the manner described, the barrier walls 54 are molded entirely in the frame sections 65. The dividing wall 59 provides one of the walls of each trough and, therefore, there are no mating edges which must be sealed to prevent seeping of water out of the trough. Thus, by forming the water passage entirely in one section and by providing the intermediate wall 59, an more unique and efficient arrangement can be achieved.

The notches 55 in the barrier walls 54 provide a definite path for waterflow. These notches define a curvilinear surface since this configuration provides for the most efficient flow of water. It is desirable to avoid a very smooth surface for contact with the water to reduce the formation of water beads which can inhibit flow.

FIGS. 6 through 9 illustrate certain alternative forms of the invention. In this construction, frame sections 64 and 66 define downwardly extending walls 68 and 70 which mate along the line 72 and which provide a trough for collecting water. Openings 74 are defined in the walls 68 and 70 to permit passage of water through the walls. Located immediately beneath this wall is a wick 78 which may be formed of felt or other conventional materials. The wick is preferably dimensioned to contact the underside of the walls 68 and 70 and to extend completely over the top end of the absorbent pad 80.

The construction utilizing the trough design of FIGS. 6 through 9 in conjunction with a wick provides a highly efficient arrangement. The frame sections 64 and 66 have a relatively simple design and can be economically manufactured. The wick can be easily located relative to the pad, and it provides extremely uniform distribution of water across the construction.

Figure 7:
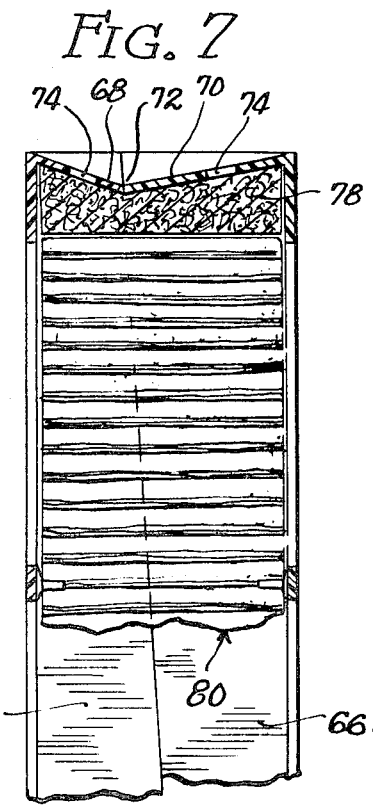
FIG. 7 is an enlarged fragmentary sectional view taken about the line 7-7 of FIG. 6.
Figure 9:
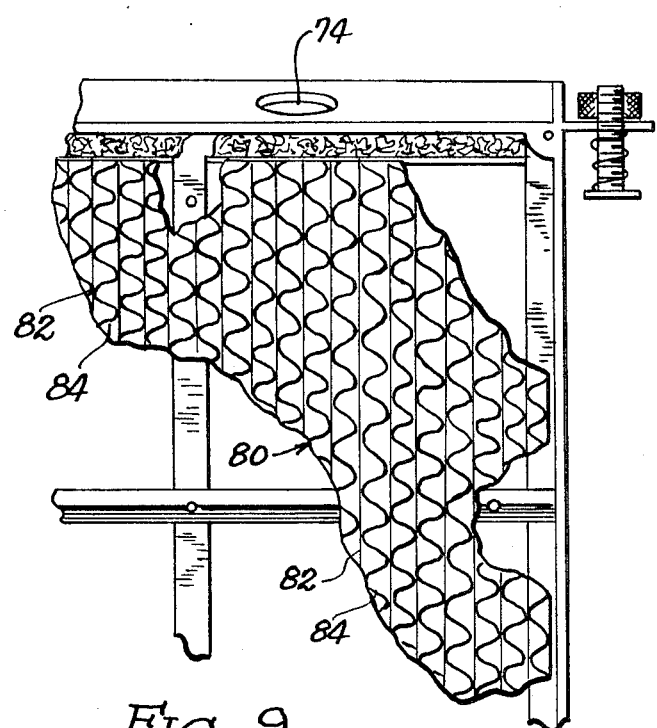
Figure 8:
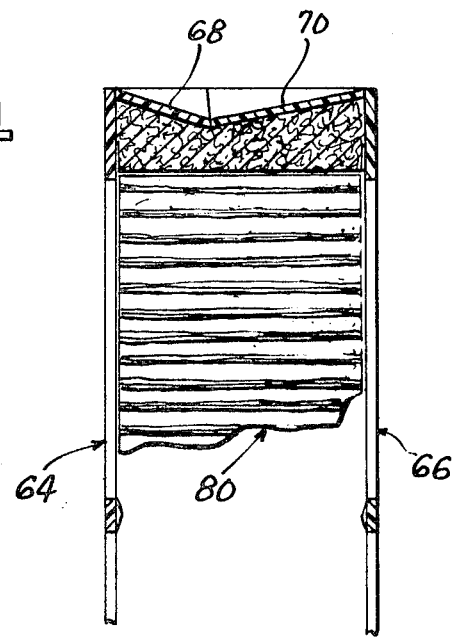
FIG. 8 is an enlarged fragmentary sectional view taken about the line 8-8 of FIG. 6; and, FIG. 9 is an enlarged fragmentary sectional view illustrating a corner of the construction shown in FIG. 6.

The arrangement of FIGS. 6 through 8 employs a pad 80 which has the alternating sheets 82 and 84 of the pad extending longitudinally. This has been found to provide an ideal arrangement for use in conjunction with a wick since the wick distributes the water evenly over the pad, and the water then moves downwardly for absorption by the pad. Without the wick, the longitudinal disposition of the pad would result in movement of the water through the pad at too rapid a rate. Prior constructions have located the sheets forming the corrugations in a horizontal position to provide barriers which prevented rapid movement of water through the pad.

The efficiency of the operation of the absorbent pads can also be substantially improved by impregnating the pad with sodium silicate. This can be accomplished by providing a sodium silicate solution and dipping each face of the pad in the solution, and when the water or other solvent has evaporated, sodium silicate will remain on the pad surface. The presence of the sodium silicate substantially increases the efficiency of the pad structures from the standpoint of water-holding ability and air pickup. Impregnation to a depth of one-eighth to one-fourth inch is all that is required to provide this substantial improvement in operating efficiency.

It will be understood that various changes and modifications may be made in the above described constructions which provide the characteristics of this invention without departing from the spirit thereof particularly as defined in the following claims.

I claim:

1. In a humidifier apparatus wherein relatively dry air is moved into contact with surfaces holding moisture for pickup of moisture by the air whereby relatively moist air is discharged by the apparatus, and wherein the surfaces for holding moisture are formed in a block which defines a plurality of passages permitting airflow through the block, the improvement comprising a frame permanently associated with the block, said frame having an outer peripheral portion including a top panel defining openings for the passage of water into contact with said block, crossmembers extending across said frame on both sides of said block between said peripheral portions, means formed in said frame for contact with said block for supporting said against sagging intermediate its side edges, wing members extending outwardly from the frame adjacent the top of the frame, said wing members providing means for supporting said frame, and the associated block relative to the humidifier apparatus and including vertically adjustable leveling means associated with said wings, said leveling means comprising bolts having nuts at one end whereby said frame can be positioned by varying the relative positions of the bolts and nuts, and including springs for normally holding said wings in abutting relationship with said nuts to provide a resilient mounting for the frame and block.

2. In a humidifier apparatus wherein relatively dry air is moved into contact with surfaces holding moisture for pickup of moisture by the air whereby relatively moist air is discharged by the apparatus, and wherein the surfaces for holding moisture are formed in a block which defines a plurality of passages permitting airflow through the block, the improvement comprising a frame permanently associated with the block, said frame having an outer peripheral portion including a top panel defining openings for the passage of water into contact with said block, crossmembers extending across said frame on both sides of said block between said peripheral portions, means formed in said frame for contact with said block for supporting said block against sagging intermediate its side edges, a trough defined by the top panel of said frame, said trough being defined by opposed, downwardly extending wall openings defined by at least one of said walls, and including a wick extending beneath said trough and over the top of said block whereby water is distributed from said trough through said wick and then to said block, said wick having a flat bottom surface substantially coextensive with the top of said block and a V-shaped upper surface substantially coextensive with the walls of said troughs.

3. An apparatus in accordance with claim 2, wherein said block is formed of corrugated material comprising alternating flat sheets and intermediate undulating sheets holding the flat sheets in spaced relationship, and wherein all of said sheets extend vertically in said apparatus.

4. An apparatus in accordance with claim 2 including a plurality of pegs extending inwardly from said crossmembers to provide said means for supporting said block against sagging, and including ribs formed adjacent the sides of said frame, said ribs extending into contact with the side edges of said block for supporting said side edges.

5. An apparatus in accordance with claim 4 wherein the sides of said frame comprise panels which include flanges extending over the face of said block adjacent said side edges, said ribs extending inwardly from said flanges and being disposed at an angle relative to said side panels.

6. An apparatus in accordance with claim 4 wherein said crossmembers extend vertically and horizontally across said frame, said pegs being formed on each crossmember and said pegs having a length substantially less than the thickness of said block whereby only portions immediately below the surfaces of said block are engaged by said pegs.

7. In a humidifier apparatus wherein relatively dry air is moved into contact with surfaces holding moisture for pickup of moisture by the air whereby relatively moist air is discharged by the apparatus, and wherein the surfaces for holding moisture are formed in a block which defines a plurality of passages permitting airflow through the block, the improvement comprising a frame permanently associated with the block, said frame having an outer peripheral portion including a top panel defining openings for the passage of water into contact with said block, crossmembers extending across said frame on both sides of said block between said peripheral portions, means formed in said frame for contact with said block for supporting said block against sagging intermediate its side edges, a trough defined by said top panel of the frame, said trough being formed by peripheral walls, and including transversely extending walls dividing the trough into a plurality of individual basins, at least one of said openings being provided in each basin, a plurality of additional, separately located barrier walls formed in said trough in surrounding relationship with respect to said openings, and including notches formed in said additional walls through which the water passes, said frame being formed of a pair of opposed sections adapted to be brought into mating relationship, each of said sections defining sidewall portions and top wall portions, and wherein said additional walls and said openings are formed entirely in the top wall portion of one of said sections.

8. An apparatus in accordance with claim 7, wherein said sidewall portions each include narrow portions at one end and wide portions at the opposite end whereby the sections can be mated to form a rectangular configuration 9. An apparatus in accordance with claim 7 wherein said block is formed of corrugated absorbent material, and wherein the passages formed by said corrugations extend upwardly at an angle from the entry ends for the air to the exit ends of the passages.

10. An apparatus in accordance with claim 7 including handles associated with the top panel of said construction, said top handle defining upstanding surrounding walls, openings defined by said walls, and pegs formed at the ends of said handles for receipt within said openings.

11. An apparatus in accordance with claim 7 wherein said block is formed of absorbent corrugated material, and wherein the opposed faces of said material are impregnated with sodium silicate prior to inclusion of the block in the apparatus.

12. An apparatus in accordance with claim 7 wherein said block is formed of corrugated material comprising alternating flat sheets and intermediate undulating sheets holding the flat sheets in spaced relationship, and wherein all of said sheets extend vertically in said apparatus.